Patented May 17, 1949

2,470,085

UNITED STATES PATENT OFFICE 2,470,085

SUBSTITUTED AMINO ALKYL TETRAZOLES

Edward K. Harvill, Orange, and Robert M. Herbst, Short Hills, N. J., assignors to E. Bilhuber, Inc., Orange, N. J., a corporation of New Jersey No Drawing. Application March 7, 1947, Serial No. 733,178

4 Claims. (Cl. 260—308)

This invention relates to new and valuable chemical compounds which are substituted amino alkyl tetrazoles of the general formula:

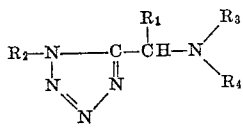

wherein $R_1$ may be hydrogen, alkyl, aryl, or aralkyl and wherein $R_3$ and $R_4$, either one or both, may be hydrogen, alkyl, alkenyl, cycloalkyl, aryl or aralkyl, or $R_3$ and $R_4$ may together with nitrogen form a cyclic system, for example, piperidine or morpholine, and wherein $R_2$ may be an aryl, cycloalkyl, alkyl or heterocyclic group, such as pyridyl, quinolyl, isoquinolyl, etc.

This application is a continuation-in-part of our copending applications Serial No. 546,731, filed July 26, 1944, and Serial No. 618,580, filed September 25, 1945.

The new compounds aforesaid are valuable therapeutic agents, which are particularly effective as sedatives and anesthetics, such action being completely unexpected and never having been associated with the molecular configuration exhibited by these compounds.

These therapeutic agents are produced from hitherto unknown intermediates, substituted alpha-halogen alkyl tetrazoles, which are new compounds especially valuable for the synthesis of therapeutically useful tetrazoles. These substituted alpha-halogen alkyl tetrazoles have the following general formula:

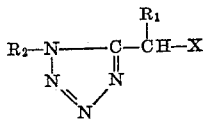

wherein $R_1$ is hydrogen, alkyl, aryl or aralkyl, X is chlorine or bromine and $R_2$ is an aryl, cycloalkyl, alkyl or heterocyclic group, such as pyridyl, quinolyl, isoquinolyl, etc.

These alpha-halogen alkyl tetrazoles are prepared as described in our above mentioned copending applications, from N-substituted amides of alpha-halogen acids, by causing hydrazoic acid or sodium azide to react with the product formed by the interaction of phosphorus pentachloride and the substituted amide.

The following example, taken from said copending applications illustrates the method as specifically applied to the synthesis of the alpha-halogen alkyl tetrazole, 1-phenyl-5-chloromethyl tetrazole.

EXAMPLE 56 grams of chloroacetanilide and 500 cc. of anhydrous benzene were placed in a suitable reaction vessel, 72 grams of phosphorus pentachloride were added and the mixture was allowed to stand at room temperature until a clear solution formed. After removing the benzene and phosphorus oxychloride, the residue was immediately treated with a benzene solution of 23 grams of hydrazoic acid. After the initial reaction had subsided, the solution was refluxed until the evolution of hydrogen chloride had ceased. The benzene was removed and the residue refluxed with water. From the cooled solution, 58 grams (90.5% of theory) of 1-phenyl-5-chloromethyl tetrazole was obtained as a colorless, crystalline material from carbon tetrachloride M. P. 76–77° C.

Calculated N=28.86%, Cl=18.22%; found N=29.00%, Cl=18.26%.

In similar fashion other intermediates may be prepared, as illustrated by the numerous examples in each of said copending applications.

From these intermediate substituted alpha-halogen alkyl tetrazoles, the desired substituted amino alkyl tetrazoles are produced by reaction with primary or secondary amines as shown in the following equation:

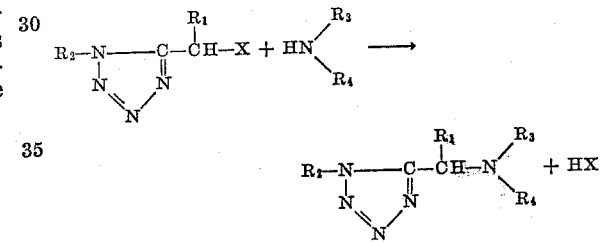

The amino alkyl tetrazoles are extremely high boiling liquids or low melting solids, and are soluble in most organic solvents and in general insoluble in water. They show the typical behavior of amines in forming salts with organic and mineral acids, such as tartaric, succinic, mucic, citric, hydrochloric, phosphoric, hydrobromic, sulphuric and nitric acids. These salts are soluble in water in varying degree and such aqueous solutions are admirably adapted to therapeutic use.

Example 1

29 grams of 1-phenyl-5-chloromethyl tetrazole, 35 cc. of diethylamine and 150 cc. of benzene were refluxed for 3.5 hours. The residue left upon evaporation of the benzene was extracted with dilute hydrochloric acid. Upon alkalinization of the aqueous acid extract, 1-phenyl-5-diethylamino methyl tetrazole separated and was purified by distillation under reduced pressure. B. P. 181° C. at 3 mm. of mercury. Yield 30 grams.

28 grams of 1-phenyl-5-diethylamino methyl tetrazole was dissolved in dry ether and the ether solution was saturated with dry hydrogen chloride. The 1-phenyl-5-diethylamino methyl tetrazole hydrochloride precipitated as a colorless solid and was recrystallized from a mixture of ethyl acetate-isopropyl alcohol. M. P. 162–162.5° C.

Calculated, N=25.90%, Cl=13.10%; found, N=26.27%, Cl=13.11%.

Example 2

20 grams of 1-cyclohexyl-5-chloromethyl tetrazole, 10.5 grams of sodium bicarbonate and 100 cc. of allyl amine were refluxed for 3.5 hours. Aqueous sodium hydroxide was added to the residue left after evaporation of the allyl amine. The alkaline solution was distilled to remove any unreacted amine and the 1-cyclohexyl-5-allylamino methyl tetrazole separated as an oil that was taken up in ether and dried over sodium sulphate. The ether solution was saturated with dry hydrogen chloride. The 1-cyclohexyl-5-allylamino methyl tetrazole hydrochloride precipitated as a white solid that was recrystallized from isopropyl alcohol. M. P. 175.5–176° C. Yield 15 grams.

Calculated, N=27.19%; found, N=26.91%.

Example 3

19.4 grams of 1-phenyl-5-chloromethyl tetrazole, 10.5 grams of sodium bicarbonate, 50 cc. of aqueous 70% ethyl amine and 200 cc. of 99% isopropyl alcohol were refluxed for 4.5 hours. The residue left upon evaporation of the solvent was made strongly alkaline with aqueous sodium hydroxide. 1-phenyl-5-ethylamino methyl tetrazole separated as an oil which was taken up in ether and dried over sodium sulphate. The ether solution was saturated with dry hydrogen chloride and the 1-phenyl-5-ethylamino methyl tetrazole hydrochloride separated as a white solid which was recrystallized from aqueous isopropyl alcohol. M. P. 206–207° C. dec. Yield 19 grams.

Calculated, N=29.23%; found, N=29.22%.

In similar manner, the following compounds may be obtained:

1-phenyl-5-morpholinomethyl tetrazole. M. P. 96–97° C.
1-phenyl-5-piperidinomethyl tetrazole. M. P. 90.5–91.5° C.
1-isoamyl-5-piperidinomethyl tetrazole hydrochloride. M. P. 166–166.5° C.
1-cyclohexyl-5-cyclohexylaminomethyl tetrazole. M. P. 83–84° C.
1-cyclohexyl-5-aminomethyl tetrazole hydrochloride. M. P. 231° C. dec.
1-cyclohexyl-5-dimethylaminomethyl tetrazole. M. P. 60.5–61.0° C.
1-phenyl-5-isoamylaminomethyl tetrazole hydrochloride. M. P. 143–144° C.
1-p-methoxyphenyl-5-diethylaminomethyl tetrazole hydrochloride. M. P. 176.5–177° C. dec.
1-m-nitrophenyl-5-diethylaminomethyl tetrazole. M. P. 96–97° C.
1-phenyl-5-benzylaminomethyl tetrazole hydrochloride. M. P. 217.5–218.5° C. dec.
1-m-aminophenyl-5-diethylaminomethyl tetrazole. M. P. 71–72.5° C.
1-phenyl-5-allylaminomethyl tetrazole hydrochloride. M. P. 189–190° C. dec.
1-phenyl-5-b-hydroxyethylaminomethyl tetrazole hydrochloride. M. P. 150–151° C. dec.
1-phenyl-5-isobutylaminomethyl tetrazole hydrochloride. M. P. 167–168° C.
1-phenyl-5-ox-dibutylaminoethyl tetrazole hydrochloride. M. P. 142–143° C. dec.
1-cyclohexyl-5-N-methyl-N-b-phenyl propylaminomethyl tetrazole. M. P. 80–81° C.
1-p-nitrophenyl-5-diethylaminomethyl tetrazole. M. P. 72–73° C.
1-cyclohexyl-5-N-allyl-N-2-heptylaminomethyl tetrazole. B. P. 191–193° C./3 mm.
1-ox-naphthyl-5-diethylaminomethyl tetrazole. M. P. 68–69° C.
1-cyclohexyl-5-N-methyl-N-2-(6-methyl-6-hydroxy heptyl) aminomethyl tetrazole. M. P. 80–81° C.
1-phenyl-5-isopropylaminomethyl tetrazole hydrochloride. M. P. 151.5–152.5° C. dec.
1-cyclohexyl-5-propylaminomethyl tetrazole hydrochloride. M. P. 210° C. dec.
1-phenyl-5-N-ethyl-N-phenylaminomethyl tetrazole. M. P. 72.5–73.5° C.
1-phenyl-5-ox-ethyl-b-hydroxyethylaminomethyl tetrazole. M. P. 117–118° C.
1-phenyl-5-ox-methyl-b-hydroxyethylamino methyl tetrazole. M. P. 78.0–78.5° C.
1-phenyl-5-ox-methylaminoethyl tetrazole hydrochloride. M. P. 195–196° C. dec.
1-methyl-5-diethylaminomethyl tetrazole. B. P. 134–136° C./2.5 mm.
1-phenyl-5-ox-diethylaminoethyl tetrazole hydrochloride. M. P. 156–157° C. dec.
1-phenyl-5-methylaminomethyl tetrazole hydrochloride. M. P. 227° C. dec.
1-p-hydroxyphenyl-5-diethylaminomethyl tetrazole hydrochloride. M. P. 165–166° C. dec.
1-b-naphthyl-5-diethylaminomethyl tetrazole hydrochloride. M. P. 151–152° C.
1-o-diphenyl-5-diethylaminomethyl tetrazole hydrochloride. M. P. 151–152° C.
1-benzyl-5-diethylaminomethyl tetrazole hydrochloride. M. P. 145–146° C.
1-(3'-phenanthryl)-5-diethylaminomethyl tetrazole. M. P. 119.5–120.5° C.

In the foregoing examples, details for the preparation of salts of the new compounds have been disclosed. By virtue of their solubility in water, these salts are particularly useful in the formulation of medicinal agents containing salts of these new tetrazole compounds as active therapeutic agents of the character above stated.

Example 4

Two hundred grams of 1-phenyl-5-diethylaminomethyl tetrazole hydrochloride is dissolved in sufficient distilled water to make the volume of the resulting solution exactly 2000 ml. This provides a 10% solution of 1-phenyl-5-diethylaminomethyl tetrazole hydrochloride which may be used orally or which may be placed in ampules and sterilized by heating under pressure for 30 minutes for parenteral administration.

Example 5

Four hundred grams of 1-phenyl-5-diethylaminomethyl tetrazole hydrochloride is intimately mixed with 500 grams of potato starch and 100 grams of talc, and granulated with distilled water. After drying, the granulation may be pressed into tablets of suitable size and shape for therapeutic use, for example, to contain 100 mgm. of the salt (which is equivalent to approximately 85 mgm. of the active basic component).

*Example 6*

Two hundred grams of 1-alpha-naphthyl-5-diethylaminomethyl tetrazole hydrochloride is dissolved in sufficient distilled water to make the volume of the resulting solution exactly 2000 ml. This provides a 10% solution of 1-alpha-naphthyl-5-diethylaminomethyl tetrazole hydrochloride which may be used orally or which may be placed in ampules and sterilized by heating under pressure for 30 minutes for parenteral administration.

*Example 7*

Four hundred grams of 1-alpha-naphthyl-5-diethylaminomethyl tetrazole hydrochloride is intimately mixed with 500 grams of potato starch and 100 grams of talc, and granulated with distilled water. After drying, the granulation may be pressed into tablets of suitable size and shape for therapeutic use, for example, to contain 100 mgm. of the salt.

*Example 8*

Two hundred grams of 1-b-naphthyl-5-diethylaminomethyl tetrazole hydrochloride is dissolved in sufficient distilled water to make the volume of the resulting solution exactly 2000 ml. This provides a 10% solution of 1-b-naphthyl-5-diethylaminomethyl tetrazole hydrochloride which may be used orally or which may be placed in ampules and sterilized by heating under pressure for 30 minutes for parenteral administration.

*Example 9*

Four hundred grams of 1-b-naphthyl-5-diethylaminomethyl tetrazole hydrochloride is intimately mixed with 500 grams of potato starch and 100 grams of talc, and granulated with distilled water. After drying, the granulation may be pressed into tablets of suitable size and shape for therapeutic use, for example, to contain 100 mgm. of the salt.

We claim:

1. Substituted amino alkyl tetrazoles having the general formula:

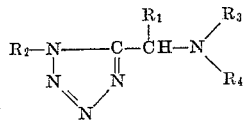

wherein $R_1$ is selected from the group consisting of hydrogen, alkyl, aryl and aralkyl; $R_2$ is selected from the group consisting of alkyl, aryl, aralkyl and cycloalkyl; and wherein the

is selected from among the following: (1) a radical wherein $R_3$ and $R_4$ are selected from the group consisting of hydrogen, alkyl, alkenyl, cycloalkyl, aryl and aralkyl, and (2) a radical wherein

is included in a cyclic system selected from among the piperidine and morpholine groups.

2. The compound 1-phenyl-5-diethylaminomethyl tetrazole.

3. The compound 1-alpha-naphthyl-5-diethylaminomethyl tetrazole.

4. The compound 1-b-naphthyl-5-diethylaminomethyl tetrazole.

EDWARD K. HARVILL.
ROBERT M. HERBST.

No references cited.